US010282302B2

(12) United States Patent
Cai et al.

(10) Patent No.: US 10,282,302 B2
(45) Date of Patent: May 7, 2019

(54) PROGRAMMABLE MEMORY-SIDE CACHE MANAGEMENT FOR DIFFERENT APPLICATIONS

(71) Applicant: Hewlett Packard Enterprise Development LP, Houston, TX (US)

(72) Inventors: Qiong Cai, Palo Alto, CA (US); Paolo Faraboschi, Palo Alto, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 11 days.

(21) Appl. No.: 15/199,285

(22) Filed: Jun. 30, 2016

(65) Prior Publication Data

US 2018/0004674 A1    Jan. 4, 2018

(51) Int. Cl.
*G06F 12/00*      (2006.01)
*G06F 12/0875*    (2016.01)
*G06F 12/0893*    (2016.01)
*G06F 9/46*       (2006.01)
*G06F 12/0866*    (2016.01)

(52) U.S. Cl.
CPC .......... *G06F 12/0875* (2013.01); *G06F 9/46* (2013.01); *G06F 12/0893* (2013.01); *G06F 12/0866* (2013.01); *G06F 2212/608* (2013.01)

(58) Field of Classification Search
CPC .......... G06F 12/0875; G06F 12/0864; G06F 2212/608
USPC ........................................ 711/125
See application file for complete search history.

(56) References Cited

U.S. PATENT DOCUMENTS

| 5,025,366 A | * | 6/1991 | Baror | G06F 12/0893 711/118 |
| 7,739,738 B1 | * | 6/2010 | Sobel | G06F 12/0891 713/164 |
| 7,814,270 B2 | | 10/2010 | Shimada | |
| 8,024,527 B2 | * | 9/2011 | Arimilli | G06F 9/30043 711/146 |
| 8,180,964 B1 | | 5/2012 | Koh et al. | |
| 2002/0156979 A1 | * | 10/2002 | Rodriguez | G06F 12/0864 711/128 |
| 2003/0221072 A1 | * | 11/2003 | Azevedo | G06F 12/0862 711/154 |

(Continued)

OTHER PUBLICATIONS

Herdrich et al., "Cache QoS: From concept to reality in the Intel® Xeon® processor E5-2600 v3 product family", IEEE International Symposium on High Performance Computer Architecture (HPCA), Mar. 2016, pp. 657-668.

*Primary Examiner* — Tuan V Thai
*Assistant Examiner* — Tasnima Matin
(74) *Attorney, Agent, or Firm* — Hewlett Packard Enterprise Patent Department

(57) ABSTRACT

Examples disclosed herein relate to programmable memory-side cache management. Some examples disclosed herein may include a programmable memory-side cache and a programmable memory-side cache controller. The programmable memory-side cache may locally store data of a system memory. The programmable memory-side cache controller may include programmable processing cores, each of the programmable processing cores configurable by cache configuration codes to manage the programmable memory-side cache for different applications.

18 Claims, 6 Drawing Sheets

(56) References Cited

U.S. PATENT DOCUMENTS

| | | | |
|---|---|---|---|
| 2006/0143396 A1* | 6/2006 | Cabot | G06F 12/121 |
| | | | 711/134 |
| 2008/0183662 A1* | 7/2008 | Reed | G06F 17/30091 |
| 2009/0259813 A1* | 10/2009 | Yasufuku | G06F 12/0811 |
| | | | 711/122 |
| 2010/0235580 A1* | 9/2010 | Bouvier | G06F 12/084 |
| | | | 711/129 |
| 2010/0325339 A1* | 12/2010 | Ogawa | G06F 3/061 |
| | | | 711/103 |
| 2011/0093661 A1* | 4/2011 | Hoogerbrugge | G06F 12/0837 |
| | | | 711/143 |
| 2013/0013903 A1* | 1/2013 | Bell, Jr. | G06F 15/7871 |
| | | | 713/1 |
| 2014/0052929 A1* | 2/2014 | Gulati | G06F 12/0815 |
| | | | 711/141 |
| 2014/0075119 A1* | 3/2014 | Kim | G06F 12/0877 |
| | | | 711/118 |
| 2014/0304475 A1 | 10/2014 | Ramanujan et al. | |

* cited by examiner

PROGRAMMABLE MEMORY-SIDE CACHE MANAGEMENT FOR DIFFERENT APPLICATIONS

BACKGROUND

Cache memories may store local copies of data stored, or to be stored, in a system memory. Read and write requests may be processed using cache memories to enhance memory system performance.

BRIEF DESCRIPTION OF THE DRAWINGS

The following detailed description references the drawings, wherein.

DETAILED DESCRIPTION

Figure 1:
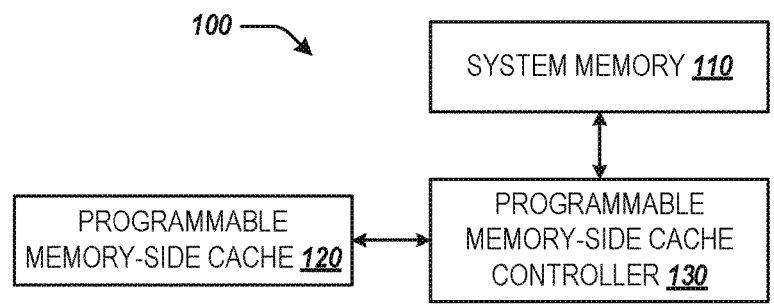
FIG. 1 is a block diagram of an example computing system for programmable memory-side cache management.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Memory-side cache memories can be used to store local copies of system memory data. In order to satisfy a memory access request, a requesting system may query a memory-side cache to determine whether a local copy of data pertaining to the access request can be obtained from the memory-side cache before attempting to access the data in the system memory. Memory-side cache memories may be smaller and have shorter access times than system memories. Therefore, obtaining local data from memory-side cache may reduce system latency. Moreover, system memory resources that would otherwise be used to fulfill access requests can be assigned to perform other tasks, thereby increasing system throughput.

Memory-side cache performance may be determined based on a cache's hit rate. A cache hit occurs when data associated with an access request can be found in the memory-side cache. Conversely, a cache miss occurs when data associated with an access request cannot be found in the memory-side cache. A cache's hit rate may be defined as a ratio of cache hits to cache misses.

Examples disclosed herein may maximize cache hit rates by providing systems and methods for programmable memory-side cache management. In the disclosed examples, a programmable memory-side cache and a programmable memory-side cache controller are provided. The programmable memory-side cache controller may include a plurality of programmable processing cores. The programmable processing cores may be programmed to execute cache configuration codes associated with different applications. Each cache configuration code may be generated to enhance the programmable memory-side cache's performance for a respective application.

In some examples, cache configuration codes may be generated based on representative workloads for different applications. The cache configuration codes may be generated such that a cache hit rate for the programmable memory-side cache under the representative workloads is greater than or equal to a target cache hit rate. The programmable processing cores of the programmable memory-side cache controller may be configured to manage the programmable memory-side cache using the generated cache configuration codes. For example, the programmable memory-side cache controller may identify a cache configuration code identifier associated with a memory transaction. The programmable memory-side cache controller may determine a generated cache configuration code among the generated cache configuration codes corresponding to the identified cache configuration code identifier and may configure at least one programmable processing core of the programmable memory-side cache controller to manage the programmable memory-side cache using the identified cache configuration code.

FIG. 1 is a block diagram of an example computing system 100 for programmable memory-side cache management. As shown in FIG. 1, computing system 100 may include a number of components, such as a system memory 110, a programmable memory-side cache 120, and a programmable memory-side cache (PMSC) controller 130. The number and arrangement of these components is an example only and provided for purposes of illustration. Other arrangements and numbers of components may be utilized without departing from the examples of the present disclosure. "Memory-side," as used herein, may be defined as being included in the memory system of a computing system. Accordingly, programmable memory-side cache 120 and PMSC controller 130 may be included in computing system 100's memory system as opposed to the processing system of computing system 100.

System memory 110 may store data accessible by processing systems. The processing systems may write to and read from system memory 110. System memory 110 be implemented by a volatile memory, such as a random access memory (RAM) (e.g., dynamic RAM (DRAM), static RAM (SRAM), etc.), or a nonvolatile memory, such as a nonvolatile RAM (NVRAM) (e.g., memristor, resistive RAM (RRAM), magnetic RAM (MRAM), phase change RAM (PCRAM), ferroelectric RAM (FRAM), etc.).

Programmable memory-side cache 120 may serve as a cache memory for system memory 110. Programmable memory-side cache 120 may be communicatively coupled to system memory 110, and PMSC controller 130 via a communications buss. In some examples, system memory 110, programmable memory-side cache 120, and PMSC controller 130 may be communicatively coupled to a processing system and a system memory controller (both not shown). In some examples, PMSC controller 130 may be included as part of the system memory controller (which may be included in computing system 100's memory system).

Programmable memory-side cache 120 may be implemented by a volatile or nonvolatile memory similar to the volatile or nonvolatile memories described above in reference to system memory 110. In some examples programmable memory-side cache 120 and system memory 110 may be implemented by the same type of memory (e.g., SRAM) and in some examples, memory-side cache 120 and system memory 110 may be implemented by different types of memory (e.g., SRAM and NVRAM). In some examples, programmable memory-side cache 120 may be smaller (i.e., may have smaller storage capacity) than system memory 110.

Programmable memory-side cache 120 may be included in the same memory as system memory 110 (i.e., in a different portion of the same memory) or in different memory from system memory 110 (e.g., included in a portion of another memory or in its own memory). In some examples, programmable memory-side cache 120 may be included on the same die as system memory 110, on a different die but same package as system memory 110, or programmable memory-side cache 120 may be included in different package from system memory 110. In some examples, programmable memory-side cache 120 may be located in the same package and/or die as a processing system or may be located on a memory module (e.g., a dual inline memory module (DIMM) or single inline memory module (SIMM). In the examples where programmable memory-side cache 120 is located on a memory module, programmable memory-side cache 120 may be located on the same or different memory module as system memory 110.

PMSC controller 130 may manage and control the operation of and access to programmable memory-side cache 120. PMSC 130 may be implemented by a programmable processor such as a processor with programmable physical/logical processing cores or a field programmable gate array (FPGA) with programmable soft processing cores. In some examples, PMSC controller 130 may be included on the same die as a processing system, on a different die but same package as a processing system, or PMSC controller 130 may be in a separate package.

PMSC controller 130 may receive and process memory instructions associated with system memory 110 and programmable memory-side cache 120. For example, PMSC controller 130 may receive and process read requests and write requests from a processing system or another requesting system.

To process a read request, PMSC controller 130 may first determine if the requested data can be found stored in programmable memory-side cache 120. If the requested data can be found stored in programmable memory-side cache 120 (cache hit), PMSC controller 130 may retrieve the requested data from programmable memory-side cache 120 and provide the data to the requesting system. If the requested data cannot be found stored in programmable memory-side cache 120 (cache miss), PMSC controller 130 may send instructions to a memory controller (not shown) associated with system memory 110 to retrieve the requested data from system memory 110. PMSC controller 130 may receive the retrieved data from the memory controller, provide the retrieved data to the requesting system, and, in some examples, store a copy of the retrieved data in programmable memory-side cache 120 so that additional requests for the retrieved data can be fulfilled from programmable memory-side cache 120.

PMSC controller 130 may process write requests using various techniques. In one technique, PMSC controller 130 receives data to be written to system memory 110 and passes the data along to the memory controller associated with system memory 110, which writes the data to system memory 110. In another technique, PMSC controller 130 receives data to be written to system memory 110 and writes the data to programmable memory-side cache 120. PMSC controller 130 may then retrieve the data from programmable memory-side cache 120 and pass it along to the memory controller associated with system memory 110, which writes the data to system memory 110.

PMSC controller 130 may be configured to manage the operation of programmable memory-side cache 120 for different applications. Applications may have different memory-side cache requirements and behaviors and therefore using the same cache configuration for programmable memory-side cache 120 for different applications may not be efficient. Accordingly, the performance of programmable memory-side cache 120 may be increased by configuring each of the programmable processing cores of PMSC controller 130 with a cache configuration tailored for each specific application.

Figure 2:
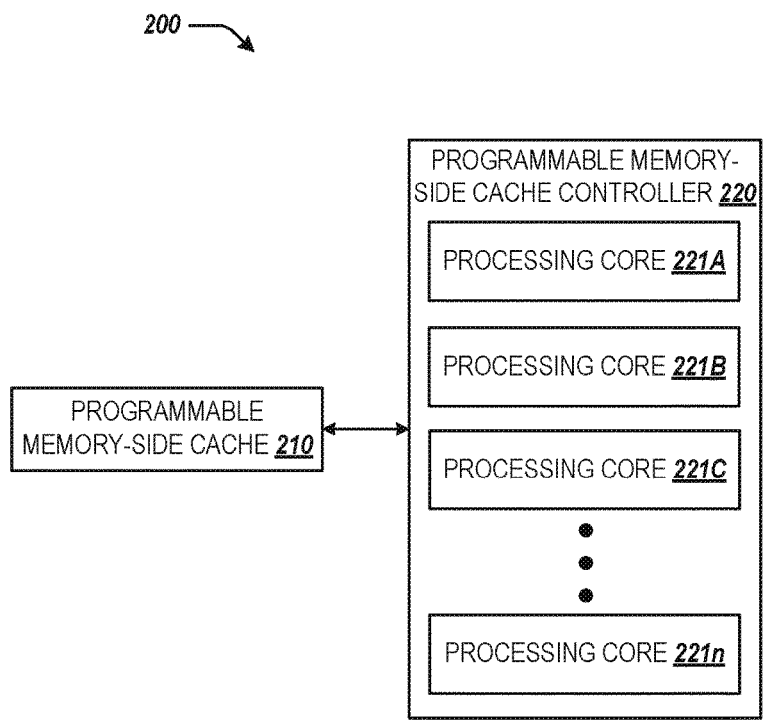
FIG. 2 is a block diagram of an example computing system for programmable memory-side cache management.

FIG. 2 is a block diagram of an example computing system 200 for programmable memory-side cache management. As shown in FIG. 2, computing system 200 may include a number of components, such as a programmable memory-side cache 210 and a programmable memory-side cache (PMSC) controller 220. The number and arrangement of these components is an example only and provided for purposes of illustration. Other arrangements and numbers of components may be utilized without departing from the examples of the present disclosure. In some examples, programmable memory-side cache 210 and PMSC controller 220 may be implemented by programmable memory-side cache 120 and PMSC controller 130 of FIG. 1, respectively.

As shown in FIG. 2, PMSC controller 220 may include processing cores 221A-221n. Processing cores 221A-221n may be programmable processing cores that are each configurable by cache configuration codes to manage memory-side cache 210 for different applications. Cache configuration codes may include machine-readable instructions executable by processing cores 221A-221n. Cache configuration codes may be stored in a machine-readable storage medium of system 200 (not shown) and installed on processing cores 221A-221n. The cache configuration codes, when installed and executed by processing cores 221A-221n, may cause processing cores 221A-221n to manage memory-side cache 210 for different applications.

The cache configuration codes may define a set of operating parameters for PMSC controller 220 to programmable manage memory-side cache 210. The operating parameters may include, for example, a block size an associativity, a replacement policy, a writing policy, and a prefetching policy for programmable memory-side cache 210.

Data may be written or read from programmable memory-side cache 210 in blocks. The block size (also referred to as line size) parameter may define the amount of data included in each block. Example block sizes include 64 bytes, 256 bytes, 512 bytes, 1 kilobyte, 2 kilobytes, 4 kilobytes, etc.

Associativity may define the parameters by which PMSC controller 220 stores data in programmable memory-side cache 210. Example associativity parameters include direct mapped (data from system memory may be stored in one possible location of programmable memory-side cache 210), n-way (e.g., 2-way, 4-way, 8-way, etc.) associativity (data from system memory may be stored in up to n possible locations of programmable memory-side cache 210), or fully associative (data from system memory may be stored in any location of programmable memory-side cache 210).

The replacement policy may define the parameters by which PMSC controller 220 replaces blocks of data in programmable memory-side cache 210 with new data. Example replacement policies include least recently used (LRU) (least recently used cache blocks are replaced first), most recently used (MRU) (most recently used cache blocks are replaced first), least frequently used (LFU) (least often used cache blocks are replaced first), adaptive replacement cache (ARC) (balance between LRU and LFU), and random replacement policies.

The writing policy may define the parameters by which PMSC controller 220 writes blocks of data to programmable memory-side cache 210 and to the system memory. Example writing policies include write back, write-through (PMSC controller 220 programmable writes to memory-side cache 210 and the system memory) and write-back (PMSC controller 220 writes data from programmable memory-side cache 210 to the system memory when the data are being replaced in programmable memory-side cache 210).

The prefetching policy may define the parameters by which PMSC controller 220 prefetches blocks of data from the system memory and stores the prefetched data in programmable memory-side cache 210. PMSC controller 220 may prefetch data when a requesting system (e.g., processing system) requests the data before the data are needed by the requesting system. Prefetching may speed up processing system performance by minimizing wait times between data requests and receipt of the data. Example prefetching policies include stride (data are prefetched based on load/store patterns of programmable memory-cache 210) and next-line (the next line in programmable memory-side cache 210 is prefetched).

Figure 3:
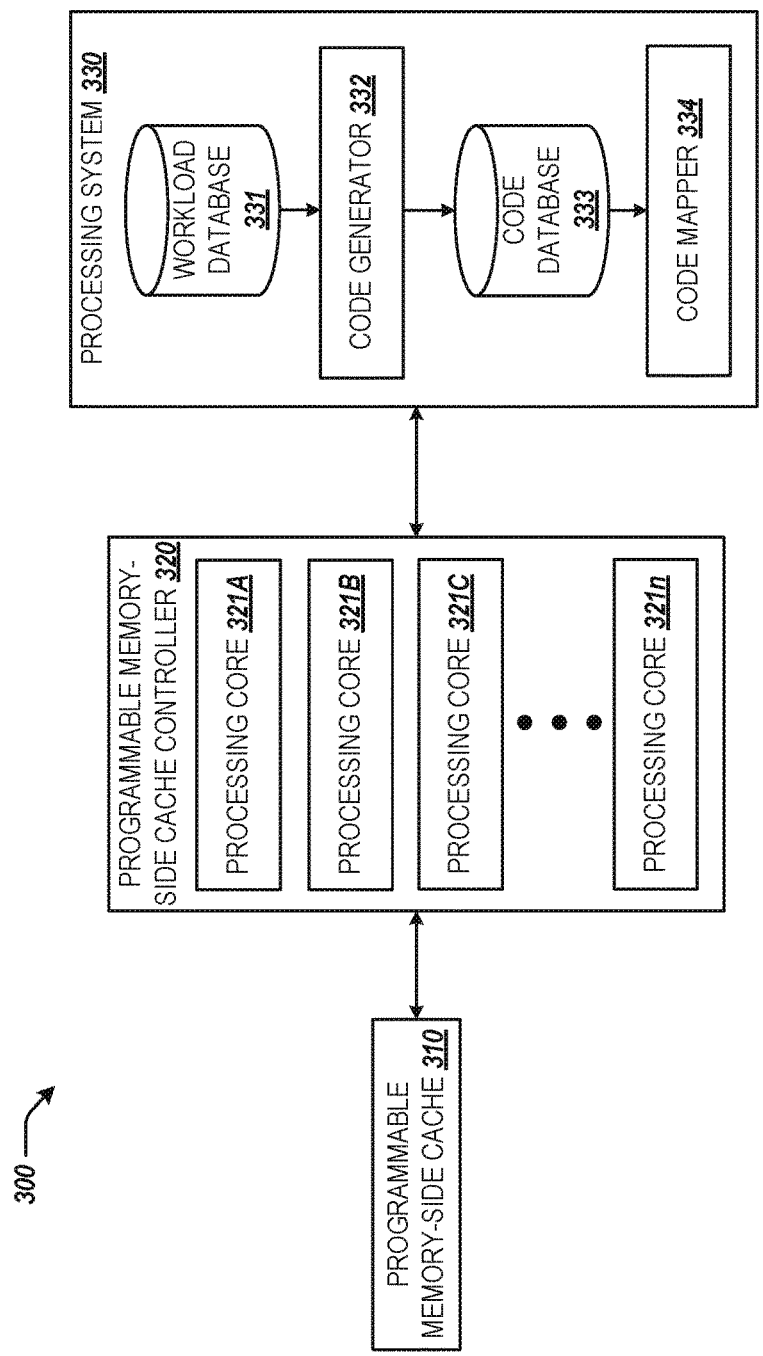
FIG. 3 is a block diagram of an example computing system for programmable memory-side cache management.

FIG. 3 is a block diagram of an example computing system 300 for programmable memory-side cache management. As shown in FIG. 3, computing system 300 may include a number of components, such as a programmable memory-side cache 310, a programmable memory-side cache (PMSC) controller 320, and a processing system 330. The number and arrangement of these components is an example only and provided for purposes of illustration. Other arrangements and numbers of components may be utilized without departing from the examples of the present disclosure. In some examples, programmable memory-side cache 310 may be implemented by programmable memory-side cache 120 of FIG. 1 and/or programmable memory-side cache 210 of FIG. 2. In some examples, PMSC controller 320 may be implemented by PMSC controller 130 of FIG. 1 and/or PMSC controller 220 of FIG. 2.

Processing system 330 may generate cache configuration codes for different applications. Each cache configuration code may be generated by processing system 330 such that the management of programmable memory-side cache 310 by PMSC controller 320 is enhanced for the application for which the cache configuration code is generated. The cache configuration code for a given application may include a set of operation parameters selected for the given application. To generate a cache configuration code for an application, processing system 330 may obtain a representative workload for the application and perform a cache configuration analysis using the representative workload. To enhance the cache configuration for the application, processing system 330 may generate the cache configuration code such that the cache configuration analysis results in an increased cache hit rate for programmable memory-side cache 310 under the representative workload.

As shown in FIG. 3, processing system 330 may include a workload database 331, a code generator 332, a code database 333, and a code mapper 334. Code generator 332 and code mapper 334 may be implemented as a combination of electronic circuitry (i.e., hardware) and software/firmware included in processing system 330 that implements the functionality of these components. Workload database 331 and code database 333 may be implemented as volatile or non-volatile memories described above or by flash memories and electrically erasable read only memory (EEPROM), and may be implemented in the same or separate memories. While workload database 331, code generator 332, code database 333, and code mapper 334 are illustrated in FIG. 3 as being included in processing system 330, these components may be included in PSMC controller 320, in another system component of computing system 300, or in stand-alone system component of computing system 300.

Workload database 331 may store representative workloads for applications that use programmable memory-side cache 310. A representative workload for an application may simulate the expected workload for the application at runtime. Representative workloads may be obtained from other components in computing system 300, from other systems, or from user input.

Code generator 332 may obtain representative workloads from workload database 331 and may use the representative workloads to generate cache configuration codes for applications associated with the representative workloads. In some examples, code generator 332 may initiate generation of cache configuration codes in response to input from a user, in response to new workloads being stored in workload database 331, at scheduled intervals, and/or in response to events that occur in computing system 300 (e.g., system startup, power-on reset, etc.). In some examples, code generator 332 may generate cache configuration codes offline to minimize run-time usage of computing system 300 processing resources.

Code generator 332 may generate cache configuration codes by performing a cache configuration analysis using the representative workloads stored in workload database 331. Code generator 332 may generate cache configuration codes such that, for an application, PMSC controller 320's management of programmable memory-side cache 310 results in an increased cache hit rate for programmable memory-side cache 310 under the representative workload of the application.

In performing a cache configuration analysis, code generator 332 may generate cache hit rate estimations for different cache configurations under a representative workload of an application. Code generator 332 may analyze the different cache configurations for the application under the representative workload to identify a cache configuration that results in a cache hit rate estimation greater than or equal to a target cache hit rate for the application. Accordingly, code generator 332 may find $HT_i(f) \geq H_i$ for the application, where $HT_i$ may be the estimated cache hit rate for an application i under a representative workload using a cache configuration f, and $H_i$ is the target cache hit rate for the application. Each cache configuration f may include a different set of operation parameters for PMSC controller 320 to manage programmable memory-side cache 310. Code generator 332 may generate a cache configuration code for the cache configuration that results in an estimated cache hit rate greater than or equal to the target cache hit rate. Code generator 332 may store generated cache configuration codes in code database 333.

Code mapper 334 may configure processing cores 321A-321n with cache configuration codes. Processing cores 321A-321n may be implemented by programmable hardware, logical, or soft processing cores of a programmable processor and/or FPGA. To configure a processing core with a cache configuration code, code mapper 334 may obtain the cache configuration code from code database 333. Code mapper 334 may configure the processing core with the obtained cache configuration code by installing it on the processing core. A processing core with an installed cache configuration code may manage programmable memory-side cache 310 based on the operation parameters specified in the installed cache configuration code.

When code mapper 334 obtains a cache configuration code from code database 333, code mapper 334 may determine the number of available cache configuration codes stored in code database 333. If the number of cache configuration codes available in code database 333 is less than or equal to the number of processing cores 321A-321n available in PMSC controller 320, then code mapper 334 may statically install cache configuration codes on processing cores 321A-321n. Code mapper 334 may statically install cache configuration codes by identifying unused processing cores among processing cores 321A-321n and installing the cache configuration codes on the identified unused processing cores.

If the number of cache configuration codes available in code database 333 is greater than the number of processing cores 321A-321n available in PMSC controller 320, then code mapper 334 may dynamically install cache configuration codes on processing cores 321A-321n. Code mapper 334 may dynamically install cache configuration codes by replacing cache configuration codes installed on processing cores 321A-321n based on various replacement policies. Example replacement policies include least recently used (LRU), least frequently used (LFU), and most recently used (MRU).

Code mapper 334 may configure processing cores 321A-321n with cache configuration codes in response to memory transactions that occur in computing system 300. For example, code mapper 334 may configure processing cores 321A-321n with cache configuration codes in response to PMSC controller 320 receiving memory instructions (e.g., read and/or write instructions). PMSC controller 320 may receive memory instructions from processing system 330 and from other systems and components in computing system 300 or other computing systems. Code mapper 334 may determine cache configuration codes in code database 333 associated with the received memory instructions and configure processing cores 321A-321n to programmable manage memory-side cache 310 according to the operation parameters included in the identified cache configuration codes.

Figure 4:
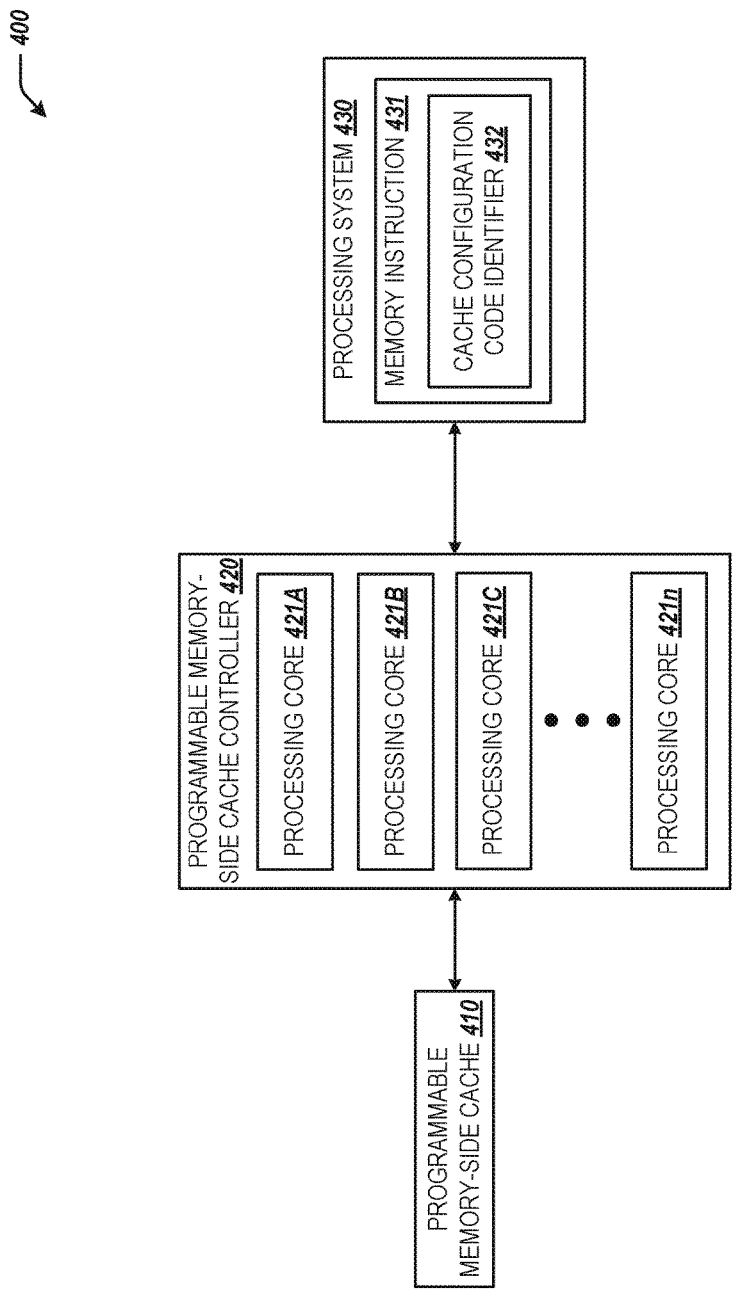
FIG. 4 is a block diagram of an example computing system for programmable memory-side cache management.

FIG. 4 is a block diagram of an example computing system 400 for programmable memory-side cache management. Like named components in computing system 400 may be similar to those described in computing system 300 of FIG. 3 in many respects.

Processing system 430 may determine cache configuration codes associated with memory instructions based on cache configuration code identifiers. For example, processing system 430 may issue memory instruction 431 to PMSC controller 420. Processing system 430 may store cache configuration code identifiers in a load/store buffer of processing system 430 and may include may include a cache configuration code identifier 432 in memory instruction 431. A code mapper of processing system 430 (e.g., code mapper 334 of FIG. 3) may determine the cache configuration code associated with memory instruction 431. The code mapper of processing system 430 may obtain the determined cache configuration code from a code database of processing system 430 (e.g., code database 333 of FIG. 3) and use the determined cache configuration code to configure a processing core among processing cores 421A-421n to manage programmable memory-side cache 410 for memory instruction 431.

Figure 5:
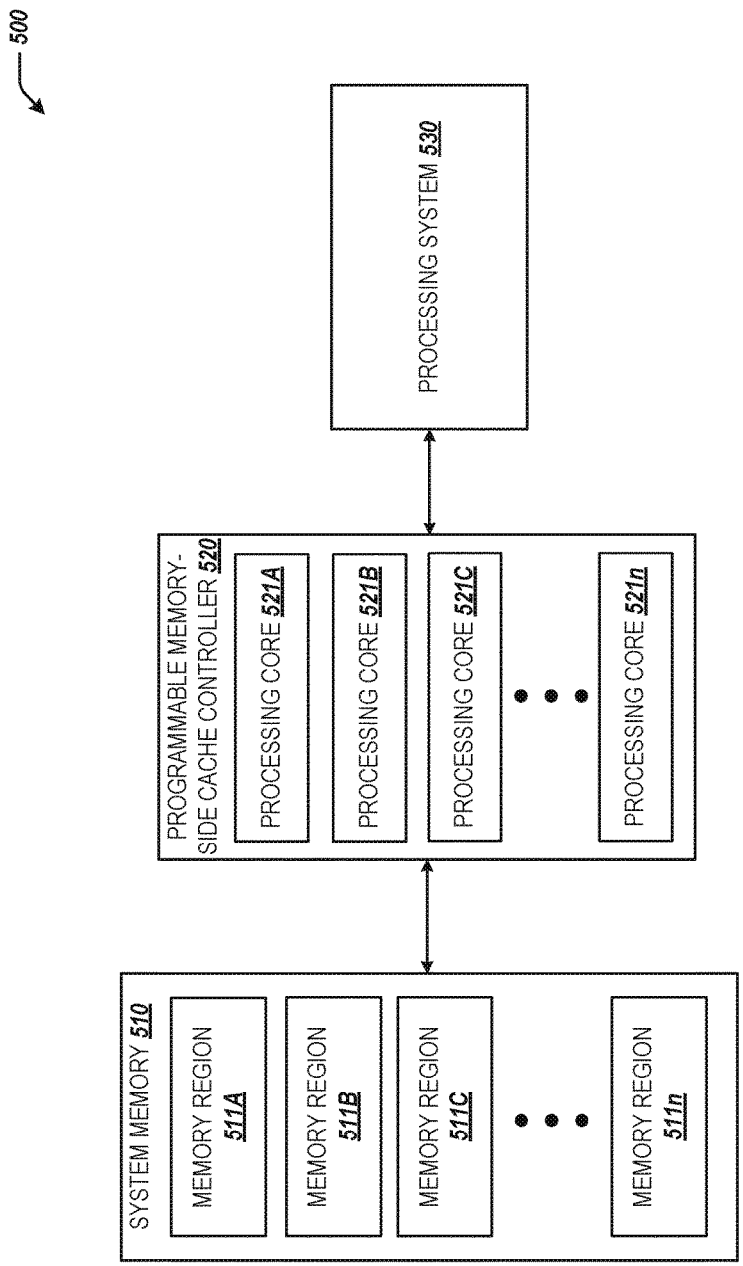
FIG. 5 is a block diagram of an example computing system for programmable memory-side cache management.

FIG. 5 is a block diagram of an example computing system 500 for programmable memory-side cache management. Like named components in computing system 500 may be similar to those described in computing system 300 of FIG. 3 and/or computing system 400 of FIG. 4 in many respects. As shown in FIG. 5, computing system 500 may include a system memory 510. In some examples, system memory 530 may be implemented by system memory 110 of FIG. 1 or another system memory.

System memory 510 may be partitioned into a plurality of memory regions 511A-511n. A code mapper of processing system 530 (e.g., code mapper 334 of FIG. 3) may configure processing cores 521A-521n with cache configuration codes in response to memory transactions associated with memory regions 511A-511n. For example, cache configuration codes may be assigned to each of memory regions 511A-511n. The data stored in each of each of memory regions 511A-511n may include physical address bits encoded with identifiers of cache configuration codes assigned to the memory regions 511A-511n storing the data. The code mapper of processing system 530 may identify a memory transaction associated with system memory 510, determine a cache configuration code associated with the memory transaction based on the cache configuration code identifier included in physical address bits of data associated with the memory transaction, and configure a processing core among processing cores 521A-5215n with the identified cache configuration code.

Figure 6:
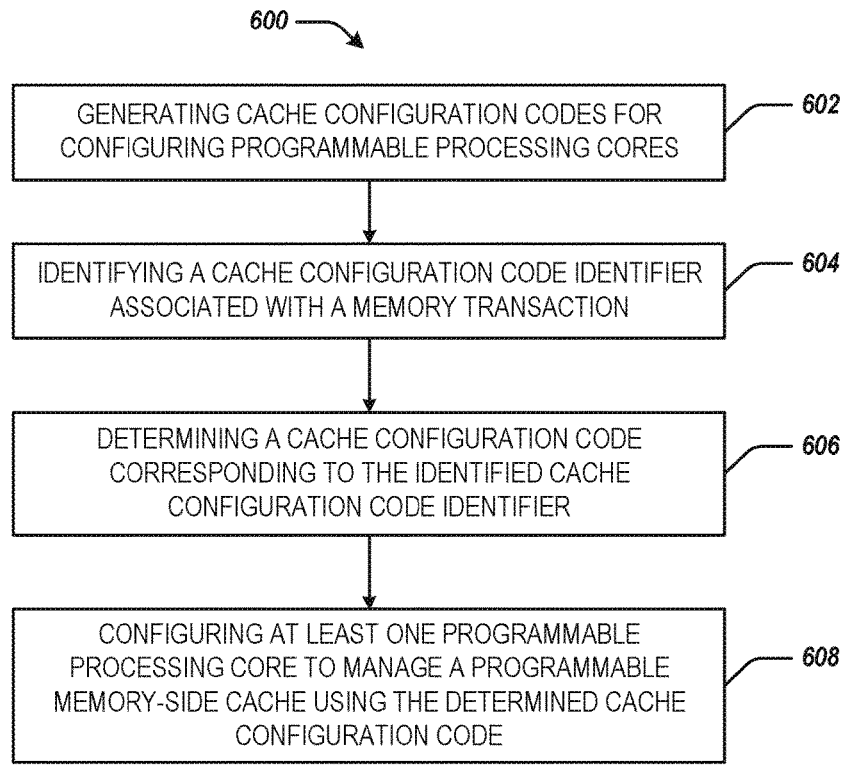
FIG. 6 is a flowchart of an example method for programmable memory-side cache management.

FIG. 6 is a flowchart depicting an example method 600 for memory-side cache management. Method 600 may be executed or performed, for example, by some or all of the system components described above in computing systems 100-500 of FIGS. 1-5. Other suitable systems may be used as well. Method 600 may be implemented in the form of executable instructions stored on a machine-readable storage medium of the system and executed by at least one processor of the system. Alternatively or in addition, method 600 may be implemented in the form of electronic circuitry (e.g., hardware). In some examples, steps of method 600 may be executed substantially concurrently or in a different order than shown in FIG. 6. In some examples, method 600 may include more or less steps than are shown in FIG. 6. In some examples, some of the steps of method 600 may, at certain times, be ongoing and/or may repeat.

At block 602, method 600 may include generating cache configuration codes for configuring programmable processing cores of a programmable memory-side cache (PMSC) controller to manage a programmable memory-side cache for different applications. Processing system 330 of FIG. 3, processing system 430 of FIG. 4, and/or processing system 530 of FIG. 5 may be responsible for implementing block 602.

At block 604, method 600 may include identifying a cache configuration code identifier associated with a memory transaction. Processing system 330 of FIG. 3, processing system 430 of FIG. 4, and/or processing system 530 of FIG. 5 may be responsible for implementing block 604.

At block 606, method 600 may include determining a cache configuration code corresponding to the identified cache configuration code identifier among the generated cache configuration codes. Processing system 330 of FIG. 3, processing system 430 of FIG. 4, and/or processing system 530 of FIG. 5 may be responsible for implementing block 606.

At block 608, method 600 may include configuring at least one programmable processing core of the PMSC controller to manage the programmable memory-side cache using the determined cache configuration code. Processing system 330 of FIG. 3, processing system 430 of FIG. 4, and/or processing system 530 of FIG. 5 may be responsible for implementing block 608.

The foregoing disclosure describes a number of example implementations for programmable memory-side cache management. The disclosed examples may include systems, devices, computer-readable storage media, and methods for programmable memory-side cache management. For purposes of explanation, certain examples are described with reference to the components illustrated in FIGS. 1-6. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 6 is an example and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A system, comprising:
a programmable memory-side cache to locally store data of a system memory; and
a programmable memory-side cache controller including programmable processing cores, each of the programmable processing cores configurable by cache configuration codes to manage the programmable memory-side cache for different applications, wherein each cache configuration code corresponds to one of the different applications and tailors performance of a cache for that one of the different applications when used to operate one of the programmable processing cores.

2. The system of claim 1, wherein each of the programmable processing cores are configured by different cache configuration codes.

3. The system of claim 1, wherein the cache configuration codes specify a block size, a replacement policy, an associativity, a writing policy, and a prefetching policy for the programmable memory-side cache.

4. The system of claim 1, wherein the cache configuration codes are generated based on representative workloads for the different applications such that a cache hit rate for the programmable memory-side cache under the representative workloads is greater than or equal to a target cache hit rate.

5. The system of claim 1, wherein cache configuration codes are dynamically installed on the programmable processing cores when a number of available cache configuration codes is greater than a number of available programmable processing cores.

6. The system of claim 5, wherein cache configuration codes are dynamically installed based on a least recently used (LRU) replacement policy.

7. The system of claim 1, comprising:
a processing system to issue memory instructions, each memory instruction including a cache configuration code identifier associated with the respective memory instruction.

8. The system of claim 7, wherein the processing system stores cache configuration code identifiers in a load/store buffer of the processing system.

9. The system of claim 7, wherein the processing system is to configure a programmable processing core of the programmable memory-side cache controller using a cache configuration code associated with a cache configuration code identifier included in a memory instruction.

10. A method for memory-side cache management, the method performed by a processing system and comprising:
generating cache configuration codes for configuring programmable processing cores of a programmable memory-side cache controller to manage a programmable memory-side cache for different applications, wherein a configuration code corresponding to a particular application tailors performance of the programmable memory-side cache for that particular application;
identifying a cache configuration code identifier associated with a memory transaction based on a requesting application requesting that memory transaction;
determining a cache configuration code corresponding to the identified cache configuration code identifier among the generated cache configuration codes; and
configuring at least one programmable processing core of the programmable memory-side cache controller to manage the programmable memory-side cache using the determined cache configuration code to tailor programmable memory-side cache performance for the requesting application.

11. The method of claim 10, wherein the generated cache configuration codes specify a block size, a replacement policy, an associativity, a writing policy, and a prefetching policy for the programmable memory-side cache.

12. The method of claim 10, wherein the cache configuration code identifier is:
included in a memory instruction associated with the memory transaction, the memory instruction being issued by the processing system; or
encoded in physical address bits included in data associated with the memory transaction.

13. A system, comprising:
a system memory including a plurality of memory regions, cache configuration codes being assigned to different memory regions;
a programmable memory-side cache controller including programmable processing cores; and
a processing system to, in response to a memory transaction associated with a memory region among the plurality of memory regions, configure a programmable processing core of the programmable memory-side cache controller to manage a programmable memory-side cache using the cache configuration code assigned to the memory region, wherein each cache configuration code corresponds to a particular application and tailors performance of a cache for that particular application when used to configure one of the programmable processing cores.

14. The system of claim 13, wherein data stored in the plurality of memory regions include physical address bits encoded with identifiers of cache configuration codes assigned to the memory regions storing the data.

15. The system of claim 14, wherein the processing system is to configure the programmable processing core based on a cache configuration code identifier included in physical address bits of data stored in the memory region associated with the memory transaction.

16. The system of claim 13, further comprising a workload database to provide representative workloads for different applications to the processing system, the processing system to produce a cache configuration code corresponding to each of the different applications.

17. The system of claim 16, further comprising a code database to store the cache configuration codes, the processing system to map and assign the codes in the code database to different memory regions of the system memory.

18. The system of claim 13, wherein each cache configuration code comprises an associativity parameter selected from directed mapped associativity, n-way associativity and fully associative associativity.

* * * * *